(12) United States Patent
Tamura

(10) Patent No.: US 8,938,789 B2
(45) Date of Patent: Jan. 20, 2015

(54) INFORMATION PROCESSING SYSTEM, METHOD FOR CONTROLLING INFORMATION PROCESSING SYSTEM, AND STORAGE MEDIUM

(75) Inventor: Yu Tamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 23 days.

(21) Appl. No.: 13/371,109

(22) Filed: Feb. 10, 2012

(65) Prior Publication Data

US 2012/0210414 A1    Aug. 16, 2012

(30) Foreign Application Priority Data

Feb. 15, 2011    (JP) .................................. 2011-029995

(51) Int. Cl.
G06F 7/04    (2006.01)
H04L 29/06    (2006.01)

(52) U.S. Cl.
CPC .......... H04L 63/168 (2013.01); H04L 63/0815 (2013.01)
USPC ............ 726/8; 726/4; 726/5; 726/7; 713/156; 713/186; 709/230

(58) Field of Classification Search
CPC .............. H04L 9/08; H04L 9/32; G06F 21/31
USPC ................. 726/4–8, 3, 28; 713/156–175, 186
See application file for complete search history.

(56) References Cited

U.S. PATENT DOCUMENTS

| | | | |
|---|---|---|---|
| 6,950,936 B2 * | 9/2005 | Subramaniam et al. ....... | 713/169 |
| 7,185,197 B2 * | 2/2007 | Wrench, Jr. ................... | 713/168 |
| 7,698,398 B1 * | 4/2010 | Lai ................................ | 709/223 |
| 7,761,910 B2 * | 7/2010 | Ransom et al. ................ | 726/6 |
| 8,205,240 B2 * | 6/2012 | Ansari et al. .................. | 726/1 |
| 8,291,098 B2 * | 10/2012 | Owen et al. ................... | 709/230 |
| 8,341,710 B2 * | 12/2012 | Tyree ............................. | 726/6 |
| 8,341,712 B2 * | 12/2012 | Machani ........................ | 726/7 |
| 8,484,283 B2 * | 7/2013 | Afergan et al. ............... | 709/203 |
| 8,527,752 B2 * | 9/2013 | Hardt ............................ | 713/166 |
| 8,578,166 B2 * | 11/2013 | De Monseignat et al. .... | 713/175 |

(Continued)

FOREIGN PATENT DOCUMENTS

| CN | 1653781 A | 8/2005 |
|---|---|---|
| CN | 101741840 A | 6/2010 |

(Continued)

OTHER PUBLICATIONS

Charfi A, Using aspects for security engineering of web service composition, Jul. 2005, vol. 10, pp. 59-66.*

(Continued)

*Primary Examiner* — Dede Zecher
*Assistant Examiner* — Viral Lakhia
(74) *Attorney, Agent, or Firm* — Canon USA, Inc., IP Division

(57) ABSTRACT

An information processing system stores key information for determining an authentication device and information about the authentication device by associating these information pieces with each other and extract the key information from access of an unauthenticated user. Based on the information about the authentication device associated with the key information, the access of the unauthenticated user is redirected.

13 Claims, 20 Drawing Sheets

(56) References Cited

U.S. PATENT DOCUMENTS

| | | |
|---|---|---|
| 8,806,187 B1* | 8/2014 | Vemula et al. ............... 713/150 |
| 2002/0188738 A1 | 12/2002 | Gray |
| 2004/0187076 A1* | 9/2004 | Ki et al. ....................... 715/513 |
| 2006/0218630 A1* | 9/2006 | Pearson et al. ................. 726/8 |
| 2007/0143829 A1* | 6/2007 | Hinton et al. .................. 726/5 |
| 2008/0059804 A1* | 3/2008 | Shah et al. ................... 713/186 |
| 2008/0189774 A1* | 8/2008 | Ansari et al. .................. 726/7 |
| 2010/0138899 A1* | 6/2010 | Yamamoto et al. ............ 726/3 |
| 2010/0281530 A1* | 11/2010 | Tarkoma ........................ 726/9 |
| 2010/0287606 A1* | 11/2010 | Machani ........................ 726/7 |
| 2011/0030041 A1* | 2/2011 | Favazza et al. ................ 726/5 |
| 2011/0314532 A1* | 12/2011 | Austin et al. .................. 726/8 |
| 2012/0151568 A1* | 6/2012 | Pieczul et al. ................. 726/8 |
| 2012/0204231 A1* | 8/2012 | Holtmanns et al. ........... 726/3 |

FOREIGN PATENT DOCUMENTS

| | | |
|---|---|---|
| EP | 2194482 A1 | 6/2010 |
| JP | 2001-222508 A | 8/2001 |
| JP | 2007-310512 A | 11/2007 |
| JP | 2010-128719 A | 6/2010 |
| WO | 03/049000 A1 | 6/2003 |

OTHER PUBLICATIONS

Kormann David, Computer Networks, Jun. 2000, Science Direct, vol. 33, pp. 51-58.*

* cited by examiner

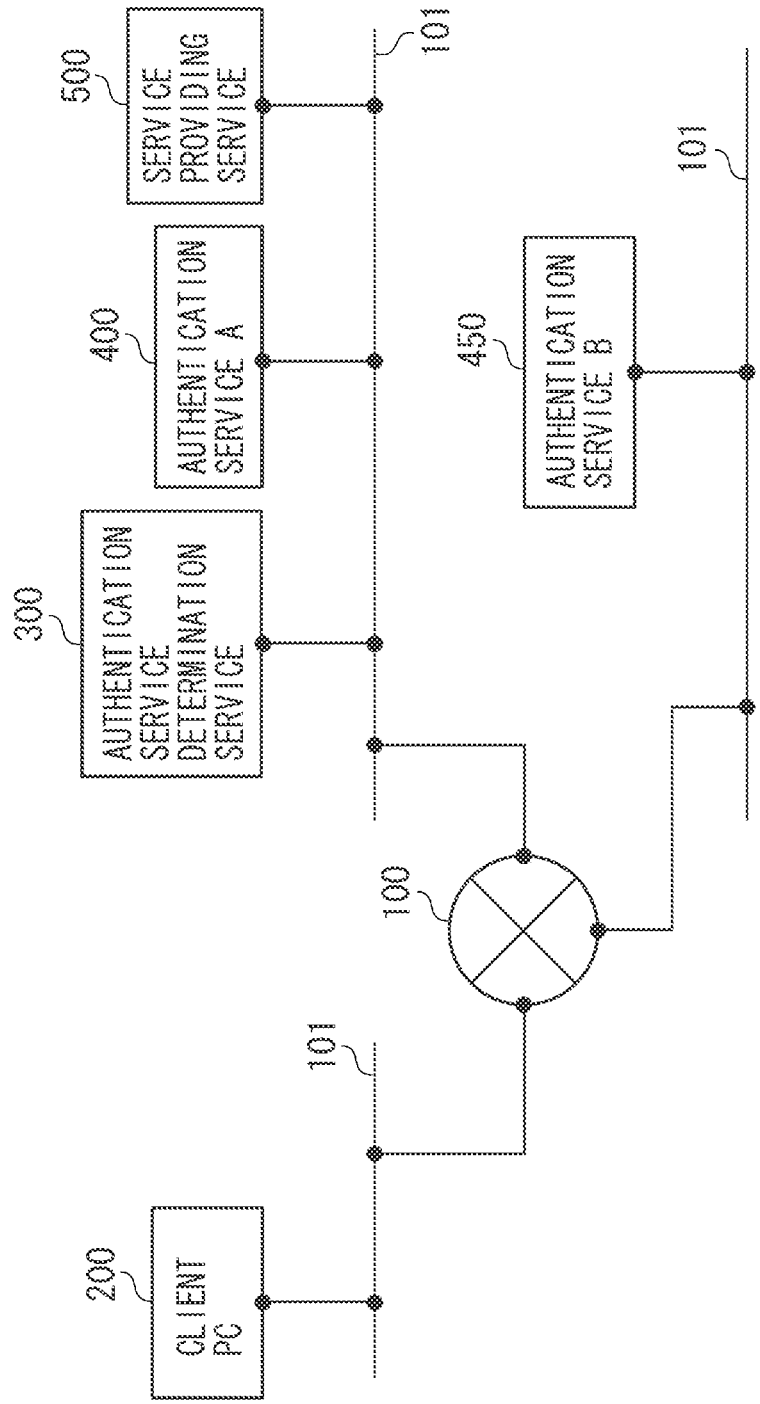

FIG. 4

| USER ID | URL OF IdP |
|---|---|
| user001 | http://service_b/?sp=http%3A%2F%2Fservice_a%2F |
| user002 | http://service_a/ |
| user003 | http://service_b/?sp=http%3A%2F%2Fservice_a%2F |
| : | : |

AUTHENTICATION SERVICE A AUTHENTICATION PAGE

USER ID

PASSWORD

LOGIN

FIG. 10B

AUTHENTICATION SERVICE B AUTHENTICATION SITE | AUTHENTICATE WITH THE FOLLOWING INFORMATION

USER ID

PASSWORD

FIG. 12

| COMPANY ID | URL OF IdP |
|---|---|
| 11111111 | http://service_b/?sp=http%3A%2F%2Fservice_a%2F |
| 22222222 | http://service_a/ |
| 33333333 | http://service_b/?sp=http%3A%2F%2Fservice_a%2F |
| : | : |

650

INFORMATION PROCESSING SYSTEM, METHOD FOR CONTROLLING INFORMATION PROCESSING SYSTEM, AND STORAGE MEDIUM

BACKGROUND OF THE INVENTION

1. Field of the Invention

The present invention relates to an information processing system complying with single sign-on, a method for controlling the information processing system, and a storage medium.

2. Description of the Related Art

Conventionally, as techniques for coordinating authentication among a plurality of service, single sign-on (hereinafter, referred to as SSO) systems using Security Assertion Markup Language (SAML) have been provided. In the SSO systems using SAML, a user has two identifications (IDs), i.e., the one at a side of an authentication service provider (identity provider, hereinafter, referred to as IdP) and the other at a side of providing a service based on an authentication result in the authentication service (service provider, hereinafter, referred to as SP).

When the user is authenticated by the IdP, the SP relies on the authentication result, and the SP authenticates the IdP as an ID for managing access by the user in the SP. This flow is referred to as IdP-initiated SSO. When an unauthenticated user who is not authenticated by the IdP accesses the SP, the SP guides the unauthenticated user to an appropriate IdP, and the unauthenticated user is to be authenticated by the IdP. This flow is referred to as SP-initiated SSO.

At the time the unauthenticated user accesses the SP, it is not possible to specify to which IdP the user is to be guided and authenticated. To solve this issue, the conventional SP-initiated SSO provides a method for displaying a list of IdPs for enabling the user to select the IdP. Japanese Patent Application Laid-Open No. 2010-128719 discusses a method for determining an IdP that satisfies a request from a SP according to an authentication level expected to be requested by the SP to which the user accesses and a user attribute, and redirecting the user thereto.

SUMMARY OF THE INVENTION

According to an aspect of the present invention, an information processing system, which provides Web services and is capable of communicating with a client and at least one authentication device for providing an authentication processing service for requesting entry of authentication information and performing authentication processing, includes a providing unit configured to provide the Web services by relying on success of the authentication processing performed by the authentication processing service without requesting entry of authentication information necessary for the authentication processing in an information processing apparatus, a storage unit configured to store key information for determining an authentication device necessary in receiving any authentication service and address information of the authentication device by associating these information pieces with each other, and an instruction unit configured to, in a case where access from the client is unauthenticated access that has not received the authentication processing service, specify the key information which coincides with the key information acquired as a result of the access and is stored by the storage unit, transmit to the client the address information of the authentication device stored by being associated with the specified key information, and issue a redirect instruction to the client such that the client accesses the authentication device in order to receive the authentication processing service.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 illustrates a network configuration.

FIG. 4 illustrates information managed by a second management module according to the exemplary embodiment of the present invention.

FIGS. 10A and 10B illustrate examples of screens for entering authentication information according to the exemplary embodiment of the present invention.

FIG. 12 illustrates information managed by a third management module according to the second exemplary embodiment of the present invention.

DESCRIPTION OF THE EMBODIMENTS

Figure 2A:
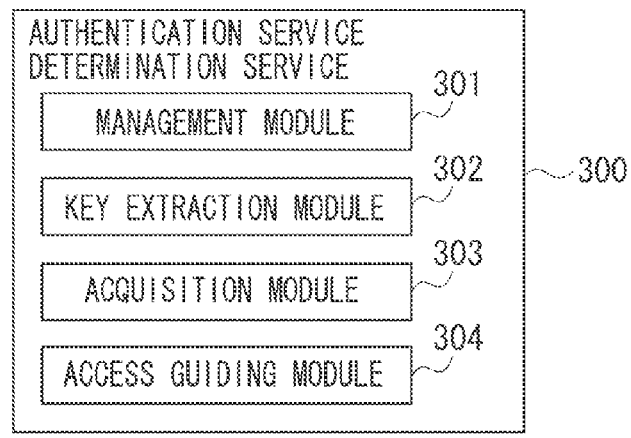
FIGS. 2A to 2D illustrate module configurations according to an exemplary embodiment of the present invention.

Various exemplary embodiments, features, and aspects of the invention will be described in detail below with reference to the drawings.

The conventional techniques include the following issues. For example, it is assumed that a user wants to use an IdP in an intranet in a company. The user needs a way to specify the IdP in the intranet. However, in terms of security, when the SP displays a list of IdPs, it is not preferable to display the IdP on the list. Because, for example, the IdP can be seen by third parties not relating to the user. In such a case, personal information about the user leaks out.

An authority transfer system according to a first exemplary embodiment of the present invention can be implemented on a network of a configuration illustrated in FIG. 1. According to the present exemplary embodiment of the present invention, a World Wide Web (WWW) system is established on a wide area network (WAN) 100. A local area network (LAN) 101 connects each constituent unit in the system. Each device in the LAN 101 can communicate with one another via the WAN 100.

A client personal computer (PC) 200 is operated by a user. An authentication service determination service 300 guides an access request of the user to an appropriate IdP. An authentication service A 400 and an authentication service B 450 perform authentication respectively. The authentication services 400 and 500 operate as IdPs (identity provider devices) respectively. The authentication services are not limited to these two services, and which IdP performs actual authentication depends on the accessed user. A service providing service 500 provides a service to an authenticated user.

The client PC 200, the authentication service determination service 300, the authentication service A 400, the authentication service B 450, and the service providing service 500 are connected with each other via the WAN 100 and the LAN 101. The client PC 200 and the individual services can be provided on individual LANs or on the same LAN. The client PC 200 and the individual services can be provided on the same PC. The authentication service determination service 300, the authentication service A 400, and the service providing service 500 are a server group established in the same network (in an intranet) in this example.

The client PC 200 accesses the service providing service 500 to receive a Web service. When the service providing service 500 receives an access request of an unauthenticated user, the service providing service 500 redirects the access request to the authentication service determination service 300. The authentication service determination service 300 redirects the unauthenticated access request to an appropriate authentication service, i.e., the authentication service A 400 or the authentication service B 450. If the authentication service A 400 or the authentication service B 450 authenticates the user, the service 400 or the service 450 redirects the user to the service providing service 500 again. The service providing service 500 provides the service to the user.

Figure 20:
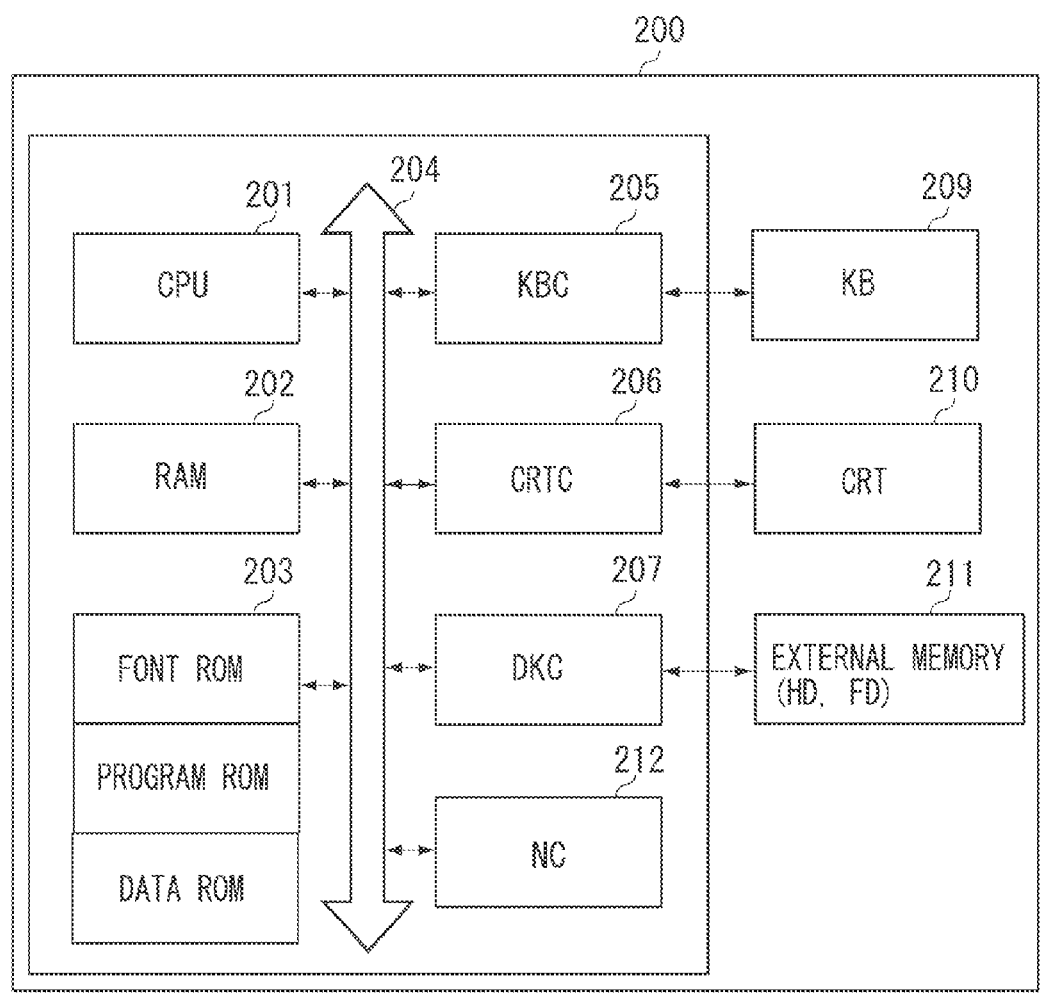
FIG. 20 illustrates a hardware configuration according to the exemplary embodiment of the present invention.

FIG. 20 illustrates a configuration of the client PC 200 according to the present exemplary embodiment of the present invention. The server computers that provide the authentication service determination service 300, the authentication service A 400, the authentication service B 450, and the service providing service 500 have a similar configuration. These services can be implemented by a server having the configuration in the hardware block diagram illustrated in FIG. 20. As described above, the hardware configuration of a general information processing apparatus can be applied to the client PC 200 and the servers according to the present exemplary embodiment.

In FIG. 20, a central processing unit (CPU) 201 executes a program such as an operating system (hereinafter, referred to as OS) or an application stored in a program read-only memory (ROM) in a ROM 203 or loaded from a hard disk 211 into a random access memory (RAM) 202. The OS runs on a computer. Processing in each flowchart described below can be implemented by executing the program.

The RAM 202 serves as a main memory, a work area, or the like of the CPU 201. A keyboard controller (KBC) 205 controls key inputs from a keyboard (KB) 209 or a pointing device (not illustrated). A cathode-ray tube controller (CRTC) 206 controls display on a cathode-ray tube (CRT) or similar display 210. A disk controller (DKC) 207 controls data access in a hard disk (HD) 211, a floppy disk (FD), or the like for storing various types of data. A network controller (NC) 212 is connected to the network and performs communication control processing with the other devices connected to the network.

In the descriptions below, unless otherwise stated, a main entity for hardware execution is preferably the CPU 201, and a main entity for software is preferably the application program installed on the HD 211.

Figure 2B:
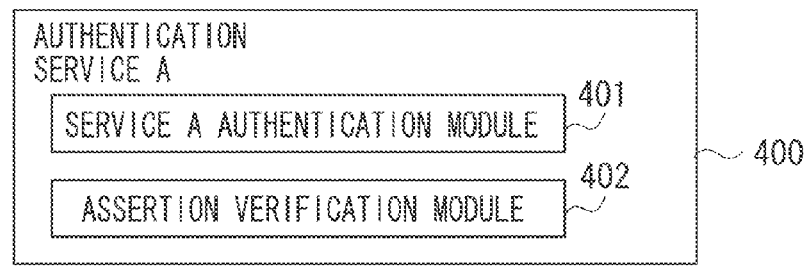
Figure 2C:
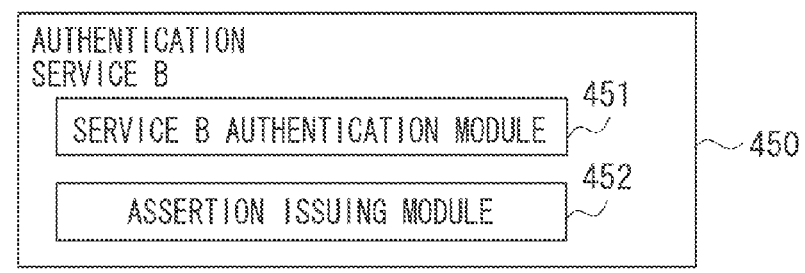
Figure 2D:
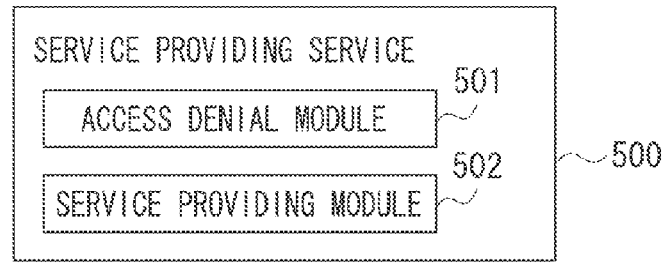

FIGS. 2A to 2D illustrate module configurations according to the present exemplary embodiment. FIG. 2A illustrates the authentication service determination service 300. FIG. 2B illustrates the authentication service A 400. FIG. 2C illustrates the authentication service B 450. Both of these two authentication services function as IdPs, however, one IdP may be used. If at least one IdP is included in the system, the present exemplary embodiment can be implemented. FIG. 2D illustrates the service providing service 500. In the first exemplary embodiment, the authentication service determination service 300, the authentication service A 400, or the service providing service 500 serves as a SP (service provider device). The SP cooperates with the IdP in single sign-on coordination.

FIG. 2A illustrates a module configuration of the authentication service determination service 300 according to the present exemplary embodiment. The authentication service determination service 300 includes a management module 301, a key extraction module 302, an acquisition module 303, and an access guiding module 304.

The management module 301 stores key information for determining an authentication device by associating the key information with information of the authentication device or devices. When the authentication service determination service 300 receives an access request from an unauthenticated user, the key extraction module 302 extracts key information for determining an authentication device from information provided at the time of the access of the user. Using the extracted key information, the acquisition module 303 acquires information of the authentication device from the management module 301. According to the extracted information of the authentication device, the access request guiding module 304 guides the user to access an appropriate authentication service.

FIG. 2B illustrates a module configuration of the authentication service A 400 according to the present exemplary embodiment. The authentication service A 400 includes a service A authentication module 401 and an assertion verification module 402.

In response to reception of an unauthenticated access request, the authentication service A 400 displays a screen as illustrated in FIG. 10A, prompts the user to input a user ID and a password, and performs authentication. In order to implement SSO, when the authentication service A 400 receives evidence for the authentication provided by another authentication service from the access of the user, the assertion verification module 402 verifies the validity of the evidence, that is, the validity of the result of authentication, and determines whether to permit the access of the user. In the present exemplary embodiment, it is assumed that the evidence for the authentication is a SAML assertion, however, in the SSO according to the present exemplary embodiment of the present invention, the evidence is not limited to the evidence using the SAML and the SAML assertion.

FIG. 2C illustrates a module configuration of the authentication service B 450 according to the present exemplary embodiment. The authentication service B 450 includes a service B authentication module 451 and an assertion issuing module 452.

In response to reception of an unauthenticated access request, the authentication service B 450 displays a screen as illustrated in FIG. 10B, prompts the user to input a user ID and a password, and performs authentication. If the user is successfully authenticated, the assertion issuing module 452 generates a SAML assertion to be an evidence for the authentication, and redirects the access of the user to an authentication service which can verify the assertion. In the present exemplary embodiment, it is assumed that the evidence for the authentication is the SAML assertion, however, in the SSO according to the present exemplary embodiment of the present invention, the evidence is not limited to the evidence using the SAML and the SAML assertion.

FIG. 2D illustrates a module configuration of the service providing service 500 according to the present exemplary embodiment. The service providing service 500 includes an access denial module 501 and a service providing module 502.

In response to reception of an access request in the service providing service 500, the access denial module 501 determines whether the access of the user has been already authenticated, and redirects the unauthenticated access to the authentication service determination service 300. If the access has been already authenticated, the service providing module 502 provides a service. The service provided by the service providing module 502 is, for example, a document storage service for storing a document in a common storage on the Internet. However, the service provided by the service providing module 502 is not limited to the document storage service.

Figure 3:
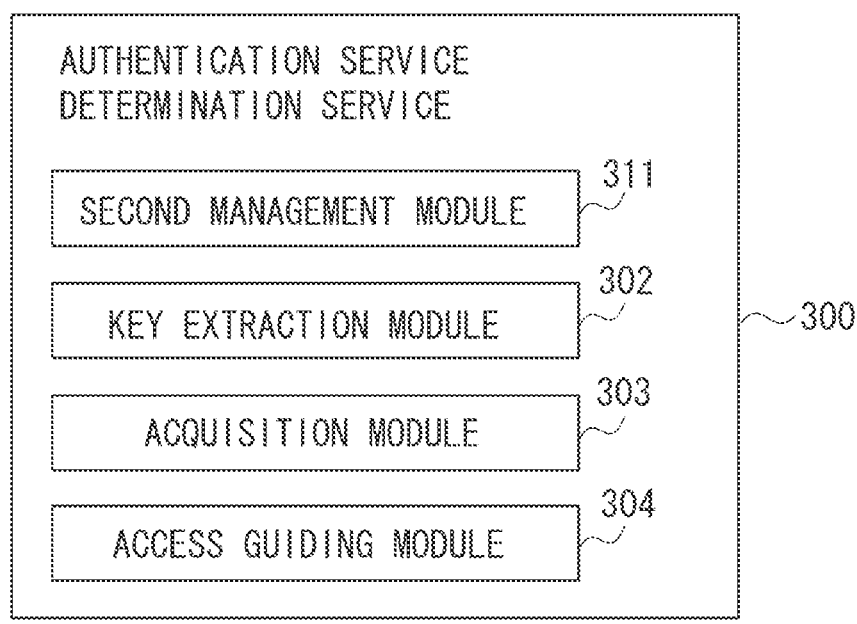
FIG. 3 illustrates a module configuration of an authentication service determination service according to the exemplary embodiment of the present invention.

FIG. 3 illustrates a module configuration of the authentication service determination service 300 in a case where a user ID is used as key information for determining an authentication device according to the present exemplary embodiment. The authentication service determination service 300 includes a second management module 311, the key extraction module 302, the acquisition module 303, and the access guiding module 304. The second management module 311 associates a user ID with information of an authentication device by which the user is authenticated, and stores the information.

FIG. 4 illustrates information managed by the second management module 311 according to the present exemplary embodiment. Management information 600 is used to associate a user ID with information (address information of each IdP) of an authentication device by which the user is to be authenticated, and store and manage the information. In the management information 600, for example, user IDs "user001" and "user003" are associated with the authentication service B 450, and a user ID "user002" is associated with the authentication service A 400. It is assumed that the authentication service B 450 implements the SSO with the authentication service A 400.

Figure 5:
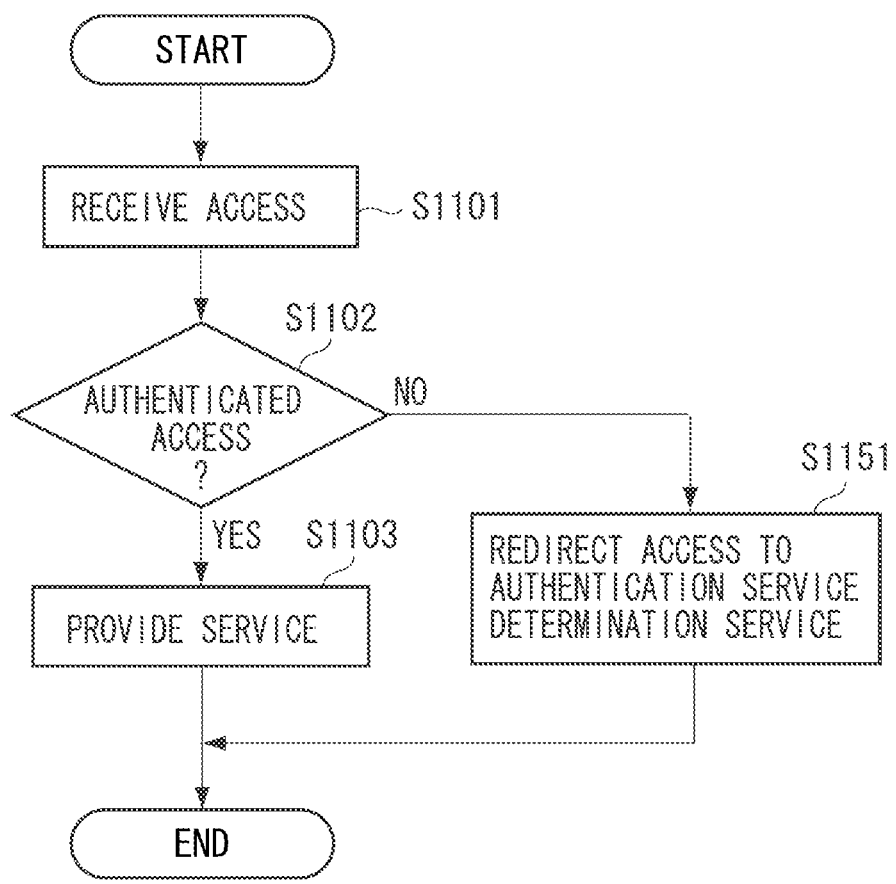
FIG. 5 illustrates a flow of processing in a service providing server according to the exemplary embodiment of the present invention.

FIG. 5 illustrates a flow of processing performed by the service providing service 500 according to the present exemplary embodiment. The processing in the flowchart starts when a user who wants to receive a service accesses the service providing service 500.

In step S1101, the service providing service 500 receives the access request of the user. In step S1102, the access denial module 501 determines whether the access request received in step S1101 is authenticated. If the access is authenticated (YES in step S1102), the processing proceeds to step S1103. If the access is not authenticated (NO in step S1102), the processing proceeds to step S1151.

In step S1103, the service providing module 502 provides the service to the access that is determined to be authenticated in step S1102, and ends the processing.

In step S1151, the access denial module 501 redirects the access that is determined to be unauthenticated in step S1102 to the authentication service determination service 300. In the processing, the access denial module 501 adds information instructing the user to access the service providing service 500 again after the completion of the authentication. After the addition of the information and the completion of the redirect, the processing in the flowchart ends.

Figure 6:
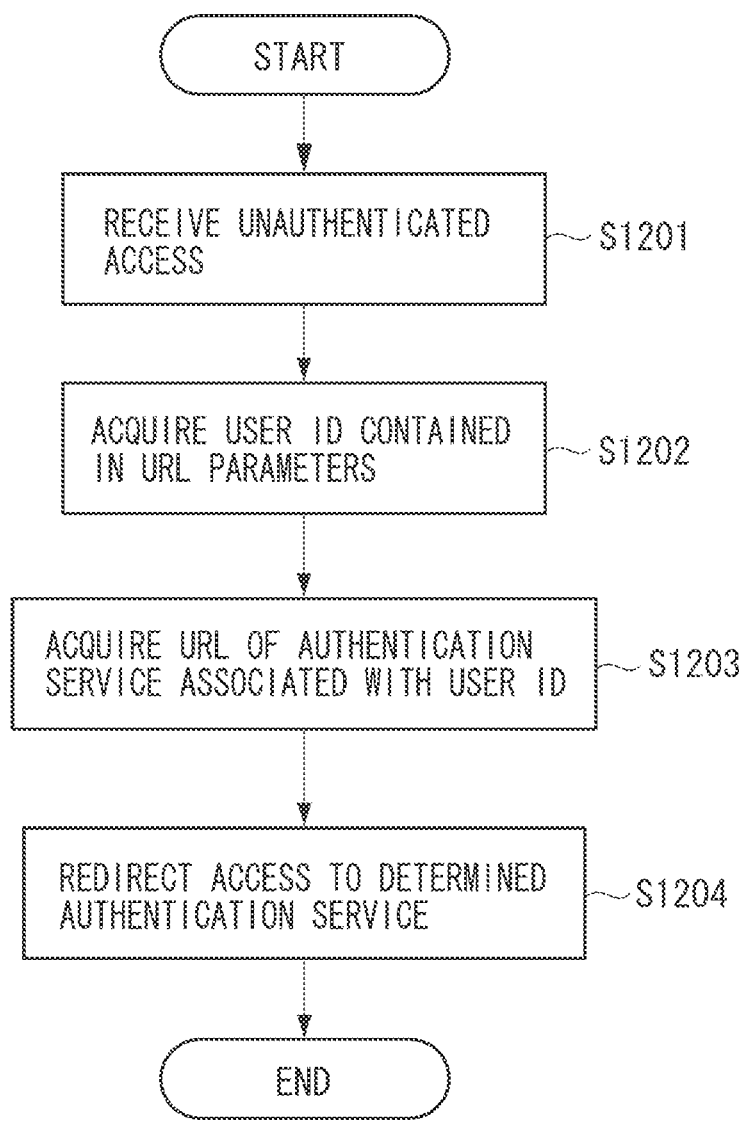
FIG. 6 illustrates a flow of processing in the authentication service determination service according to the exemplary embodiment of the present invention.

FIG. 6 illustrates a flow of processing performed by the authentication service determination service 300 according to the present exemplary embodiment. The processing in the flowchart starts when the user directly accesses the authentication service determination service or the user access is redirected by the service providing service 500. The source of the redirect of the access is not limited to the service providing service 500.

In step S1201, the authentication service determination service 300 receives an access request of an unauthenticated user. In step S1202, the key extraction module 302 extracts a user ID from uniform resource locator (URL) parameters of the unauthenticated user access. The user ID can be acquired from information other than the URL parameters.

The first half part of the URL is for accessing the individual server, and the latter half part of the URL is the user ID or key information for specifying a company ID described below. Using the feature of the URL, the user can change only the authentication destination without changing the access destination by changing only the key information in the latter half part and using the changed URL.

In step S1203, with the user ID acquired in step S1202, the acquisition module 303 acquires address information of the authentication device associated with the user ID from the second management module 311. In this processing, for example, if the user ID extracted in step S1202 is "user001", the authentication service determination service 300 searches for a user ID corresponding to the user ID, and specifies the URL "http://service_b/?sp=http%3A%2F%2Fservice_a%2F" of the authentication service B 450 that is related to the user ID. It is assumed that the URL in this example is used when the authentication service B 450 and the authentication service A 400 operate in the SSO system.

In step S1204, according to the device information acquired in step S1203, the access guiding module 304 transmits the specified URL to the client PC 200 to redirect the access of the unauthenticated user. In this processing, if in step S1201 access destination information for use after the completion of the authentication is received, in step S1204, this information is added in step S1204 and the access is redirected. If the redirect is completed, the processing in the flowchart ends.

Figure 7:
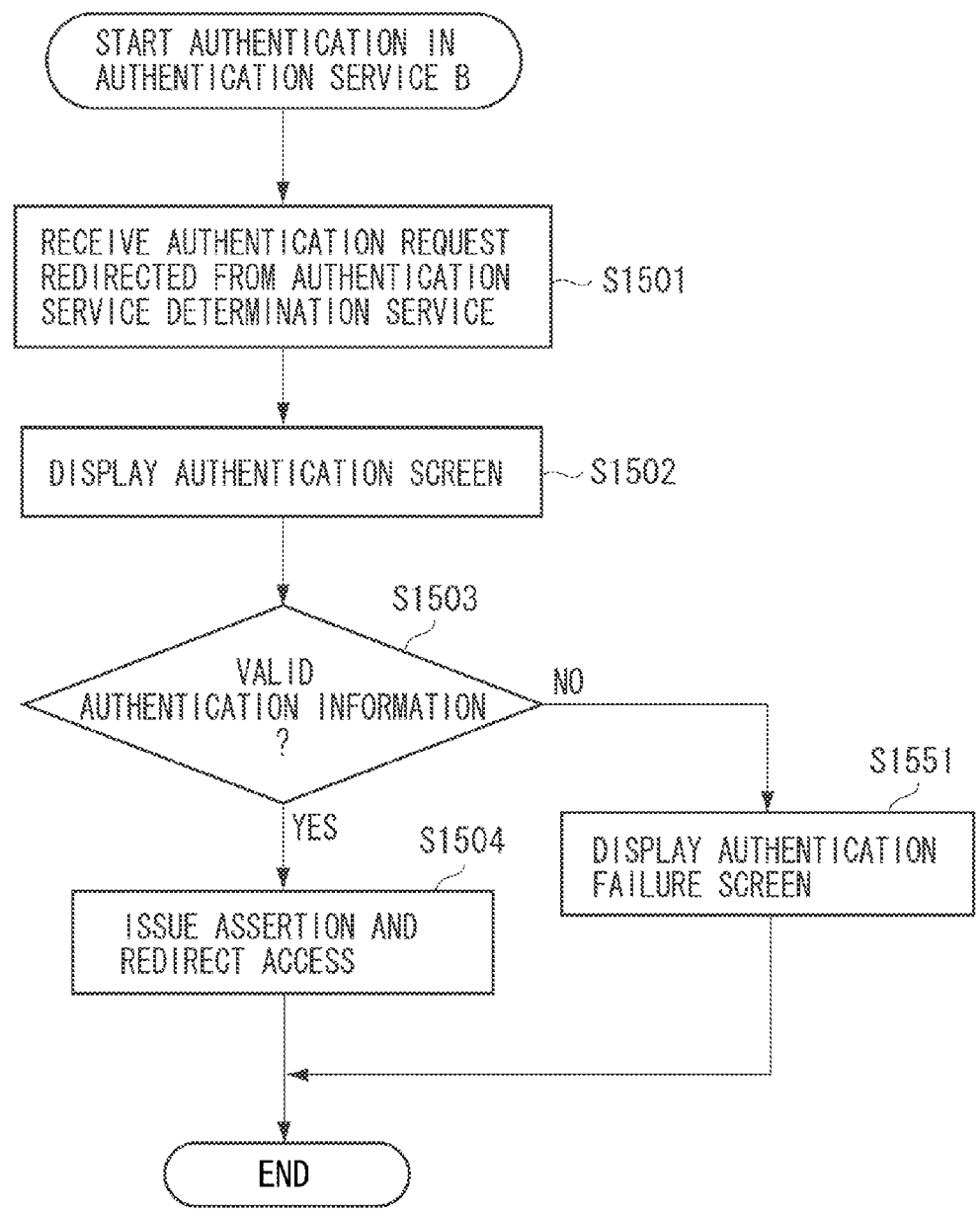
FIG. 7 illustrates a flow of processing in an authentication service B for implementing SSO according to the exemplary embodiment of the present invention.

FIG. 7 illustrates a flow of processing in the authentication service B 450 for implementing the SSO according to the present exemplary embodiment of the present invention. The processing in the flowchart starts when the authentication service determination service 300 redirects access of the user.

In step S1501, the authentication service B 450 receives an authentication request redirected from the authentication service determination service 300. Further, the authentication service B 450 acquires a redirect destination from the URL at the time the authentication is successful. In the example, the part "?sp=http%3A-%2F-%2Fservice_a%2F" indicates the redirect destination.

In step S1502, the service B authentication module 451 causes the client PC 200 to display an authentication screen 750 as illustrated in FIG. 10B.

In step S1503, the service B authentication module 451 checks whether the authentication information input via the authentication screen 750 is valid. If the authentication information is valid (YES in step S1503), the processing proceeds to step S1504. If the authentication information is invalid (NO in step S1503), the processing proceeds to step S1551.

In step S1504, the assertion issuing module 452 issues an assertion corresponding to the authentication information determined to be valid in step S1503. The assertion may be referred to as a credential. After issuing the assertion, the assertion issuing module 452 redirects the access of the user to the redirect destination URL acquired in step S1501. In this processing, if in step S1501 access destination information for use after the completion of the authentication is received, the information is added in step S1504, and the access is redirected. If the redirect is completed, the processing in the flowchart ends.

In step S1551, the service B authentication module 451 causes the client PC 200 to display a screen for notifying the user of the authentication failure due to the invalid authentication information entered via the authentication screen 750, and then the processing ends.

The client PC 200 displays the authentication failure screen transmitted from the service B authentication module 451. The screen may be a screen for transferring the processing to step S1502 again and receiving authentication information from the user, or a screen for simply displaying the failure of the authentication. The screen is not limited to these two screens. At this point, the access of the user is not authenticated. Consequently, if the user keeps trying to access the service providing service 500, the access is denied. In such a case, the flow of processing illustrated in FIG. 5 is performed.

Figure 8:
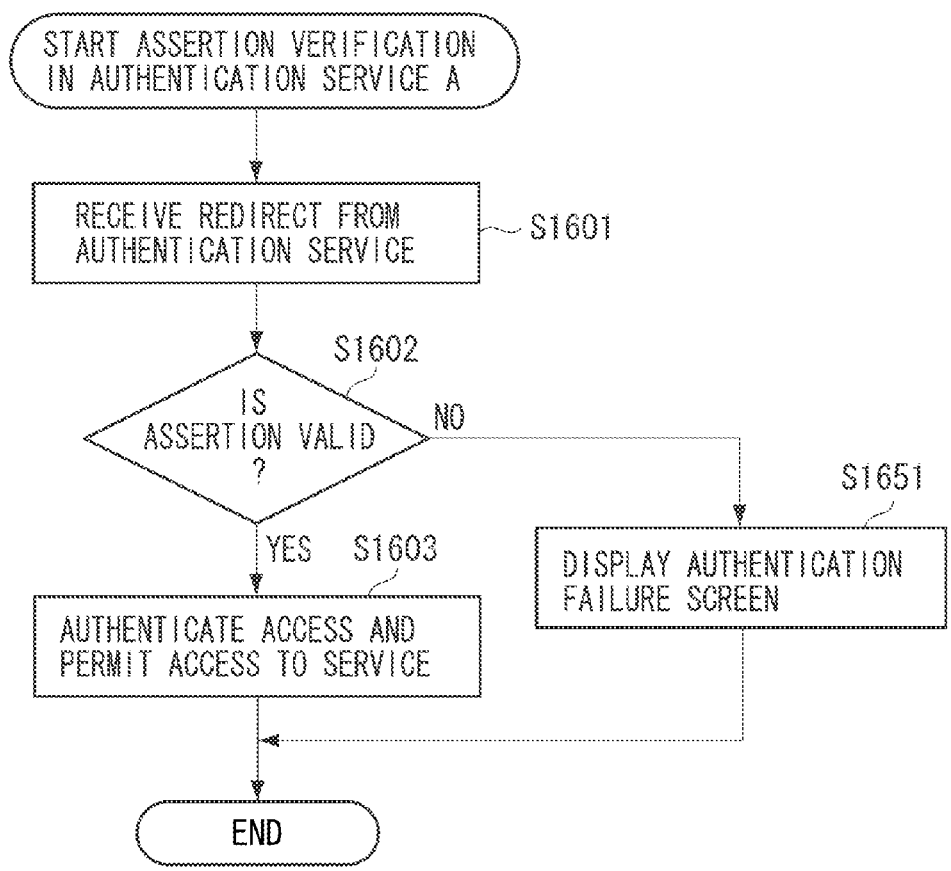
FIG. 8 illustrates a flow of processing in an authentication service A for implementing SSO according to the exemplary embodiment of the present invention.

FIG. 8 illustrates a flow of processing in the authentication service A 400 for implementing the SSO according to the present exemplary embodiment. The processing in the flowchart starts when access of the user is successfully authenticated in the authentication service B 450 and redirected.

In step S1601, the authentication service A 400 receives the redirected access from the authentication service B 450. In step S1602, the assertion verification module 402 verifies whether the assertion contained in the redirected access received in step S1601 is valid. As a result of the verification, if the assertion verification module 402 determines that the assertion is valid (YES in step S1602), the processing transfers to step S1603. If the assertion verification module 402 determines that the assertion is invalid (NO in step S1602), the processing proceeds to step S1651.

In step S1603, the service A authentication module 401 authenticates the redirected access received in step S1601, and permits access to the service. In this processing, if in step S1601 access destination information for use after the completion of the authentication is received, the service A authentication module 401 redirects the access of the user in step S1603, based on the access destination information. For example, if the service providing service 500 is specified as the redirect destination after the completion of the authentication, the service A authentication module 401 redirects the access of the user to the service providing service 500. At this point, the access of the user has been authenticated. Consequently, the user can receive the service provided by the service providing service 500. If the redirect is completed, the processing in the flowchart ends.

In step S1651, the service A authentication module 401 causes the client PC 200 to display a screen for notifying the user of the authentication failure due to the invalid assertion, and then the processing ends.

Figure 9:
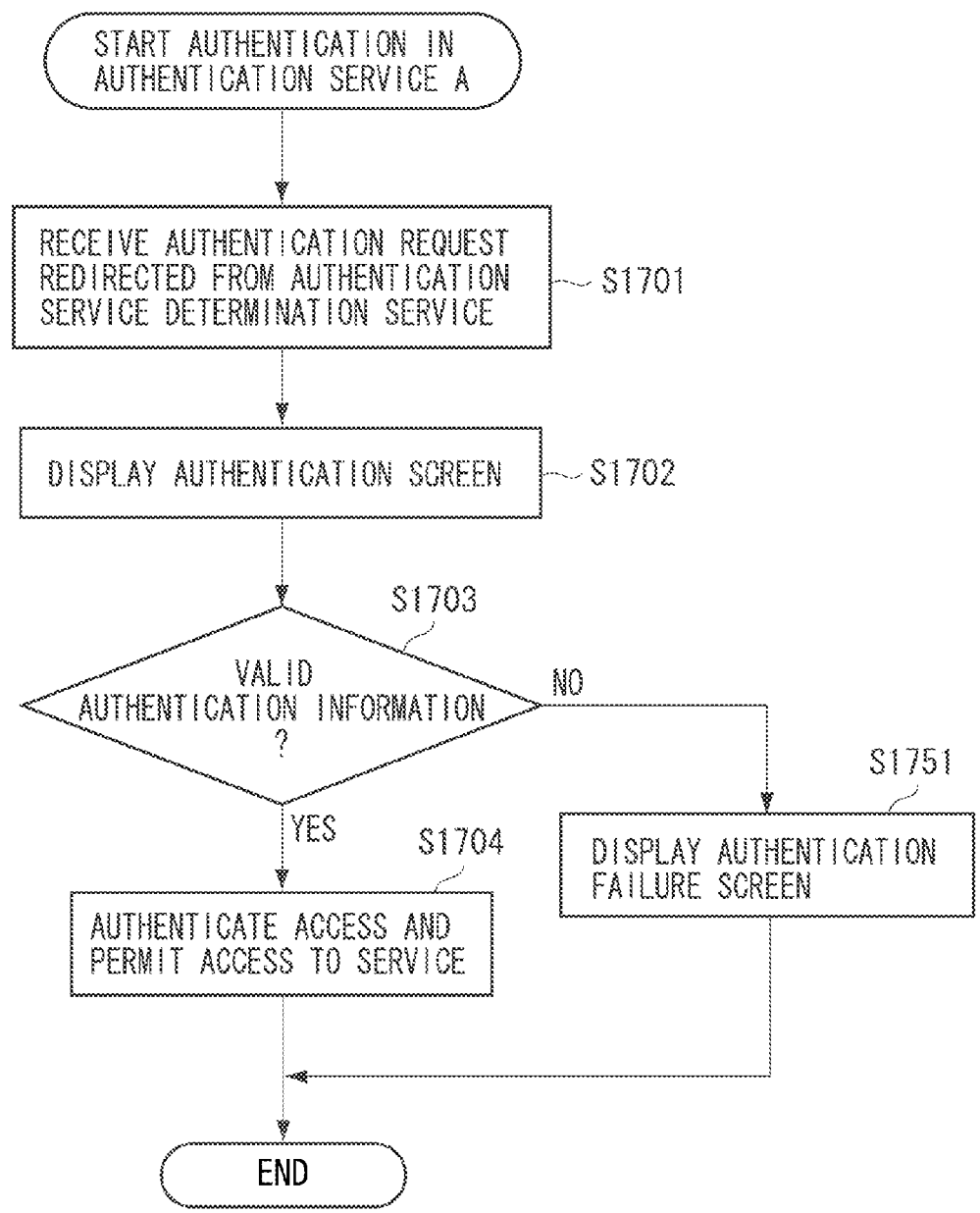
FIG. 9 illustrates a flow of processing in the authentication service A in a case where SSO is not implemented according to the exemplary embodiment of the present invention.

FIG. 9 illustrates a flow of processing in the authentication service A 400 in a case where SSO is not performed according to the present exemplary embodiment. The processing in the flowchart starts when the authentication service determination service 300 redirects the access of the user. In the processing in the flowchart, the authentication service A 400 that exists in the same security domain that the service providing service 500 exists authenticates the access of the user. In this processing flow, the authentication service B 450 does not authenticate the access of the user.

In step S1701, the authentication service A 400 receives the authentication request redirected from the authentication service determination service 300. In step S1702, the service A authentication module 401 causes the client PC 200 to display an authentication screen 700 as illustrated in FIG. 10A.

In step S1703, the service A authentication module 401 checks whether the authentication information entered via the authentication screen 700 is valid. If the authentication information is valid (YES in step S1703), the processing proceeds to step S1704. If the authentication information is invalid (NO in step S1703), the processing proceeds to step S1751.

In step S1704, the service A authentication module 401 authenticates the redirected request received in step S1701, and permits access to the service. In this processing, if in step S1701 the access destination information for use after the completion of the authentication is received, the service A authentication module 401 redirects the access of the user in step S1704 based on the access destination information. For example, if the service providing service 500 is specified as the redirect destination after the completion of the authentication, the service A authentication module 401 redirects the access of the user to the service providing service 500. At this point, the access of the user has been authenticated. Consequently, the user can receive the service provided by the service providing service 500. If the redirect is completed, the processing in the flowchart ends.

In step S1751, the service A authentication module 401 causes the client PC 200 to display a screen for notifying the user of the authentication failure due to the invalid authentication information entered via the authentication screen 700, and then the processing ends.

FIGS. 10A and 10B illustrate examples of screens for entering authentication information according to the present exemplary embodiment. FIG. 10A illustrates an authentication information entry screen for the authentication service A 400 to authenticate access of the user. The screen includes a user ID entry field and a password entry field. FIG. 10B illustrates an authentication information entry screen for the authentication service B 450 to authenticate access of the user. The screen includes a user ID entry field and a password entry field.

According to the present exemplary embodiment, the access request of the unauthenticated user can be guided to the appropriate IdP according to the user ID. Consequently, the user can receive the authentication. In the present exemplary embodiment, display of a list of the IdPs or a common repository in cooperation with the SSO system is not necessary.

A second exemplary embodiment of the present invention is described below with reference to the attached drawings. Descriptions of points similar to those in the first exemplary embodiment are omitted, and only different points will be described below.

Figure 11:
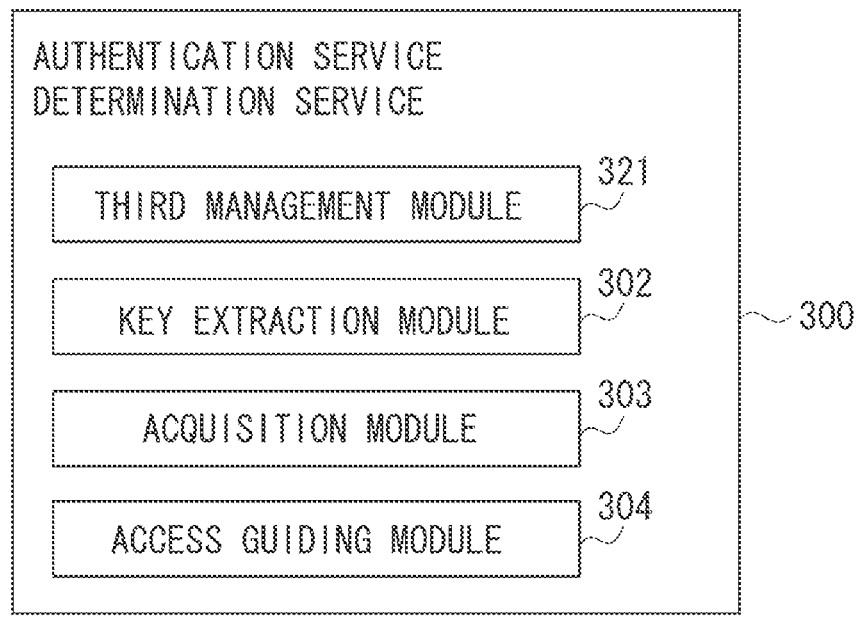
FIG. 11 illustrates a module configuration of an authentication service determination service according to a second exemplary embodiment of the present invention.

FIG. 11 illustrates a module configuration of the authentication service determination service 300 in a case where a group identifier of a user is used as key information for determining an authentication device according to the second exemplary embodiment. In the present exemplary embodiment, a company ID is used as the group identifier of the user. However, the group identifier of the user is not limited to the company ID.

The authentication service determination service 300 includes a third management module 321, the key extraction module 302, the acquisition module 303, and the access guiding module 304. The company ID is specific information uniquely assigned to an individual company that is a user of the system, and the company ID may also be referred to as a tenant ID. The third management module 321 associates the company ID with information of an authentication device by which the user is to be authenticated, and stores the information.

FIG. 12 illustrates information managed by the third management module 321 according to the second exemplary embodiment. In management information 650, a company ID is associated with information of an authentication server by which a user who belongs to the company relating to the company ID is to be authenticated. In the management information 650, for example, company IDs "11111111" and "33333333" are associated with the authentication service B 450, and a company ID "22222222" is associated with the authentication service A 400. It is assumed that the authentication service B 450 implements the SSO with the authentication service A 400.

Figure 13:
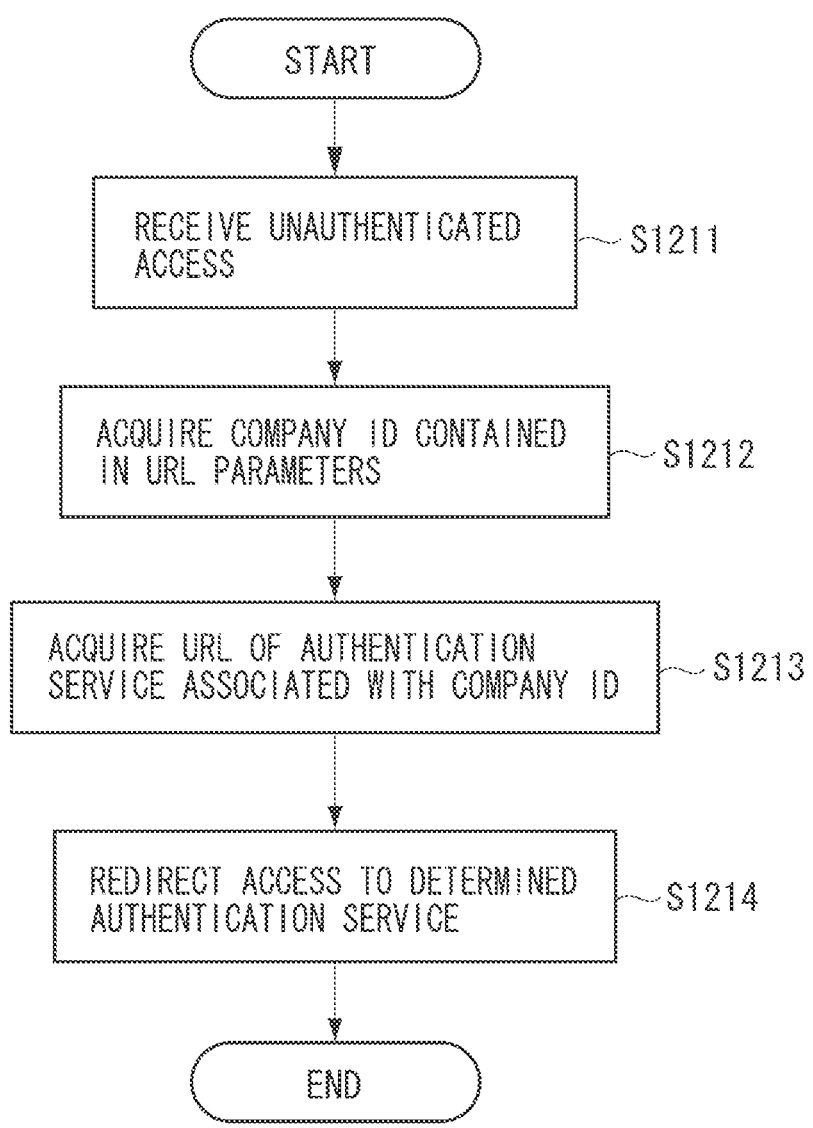
FIG. 13 illustrates a flow of processing in the authentication service determination service according to the second exemplary embodiment of the present invention.

FIG. 13 illustrates a flow of processing performed by the authentication service determination service 300 according to the second exemplary embodiment. The processing in the flowchart starts when the user directly accesses the authentication service determination service or the user access is redirected by the service providing service 500. The source of the redirect of the access is not limited to the service providing service 500.

In step S1211, the authentication service determination service 300 receives access of an unauthenticated user. In step S1212, the key extraction module 302 extracts a company ID from URL parameters of the access of the unauthenticated user. The company ID may be acquired from information other than the URL parameters. The extracted company ID is the key information.

In step S1213, using the company ID acquired in step S1212, the acquisition module 303 acquires information of the authentication device associated with the company ID from the third management module 321. For example, if the company ID extracted in step S1212 is "11111111", the device information that can be acquired is the URL "http://service_b/?sp=http%3A%2F%2Fservice_a%2F" of the authentication service B 450. It is assumed that the URL in this example is used when the authentication service B 450 and the authentication service A 400 operate in the SSO system.

In step S1214, the access guiding module 304 redirects the access of the unauthenticated user according to the device information acquired in step S1213. In this processing, if in step S1211 the access destination information after the completion of the authentication is received, the information is added in step S1214, and the access is redirected. If the redirect is completed, the processing in the flowchart ends.

According to the second exemplary embodiment, the access of the unauthenticated user can be guided to the appropriate IdP using the group identifier of the user. Consequently, the user can receive the authentication. In the present exemplary embodiment, display of the list of the IdPs or the common repository in cooperation with the SSO system is not necessary.

A third exemplary embodiment of the present invention is described below with reference to the attached drawings. Descriptions of points similar to those in the second exemplary embodiment are omitted, and only different points will be described below.

Figure 14:
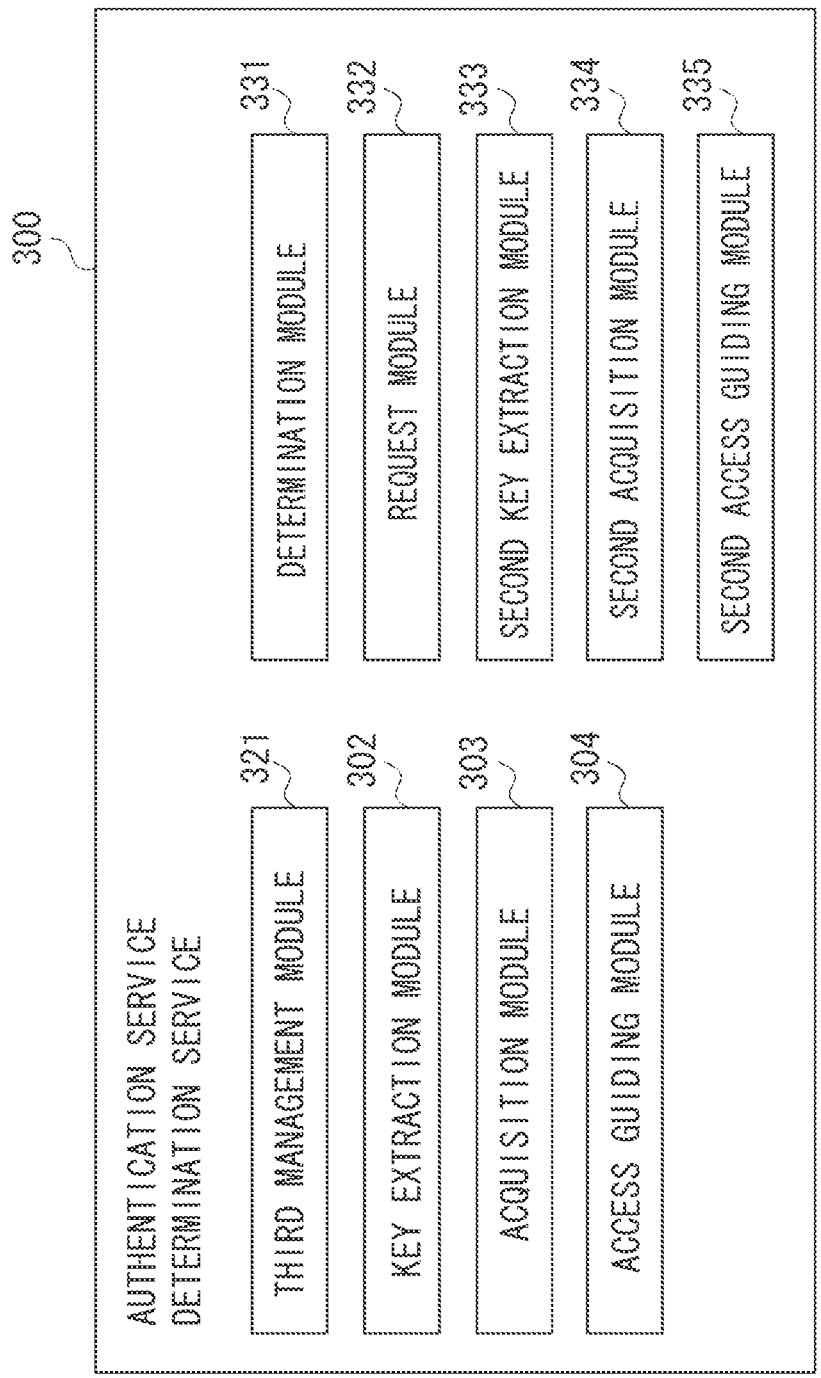
FIG. 14 illustrates a module configuration of an authentication service determination service according to a third exemplary embodiment of the present invention.

FIG. 14 illustrates a module configuration of the authentication service determination service 300 according to the third exemplary embodiment. In the present exemplary embodiment, the third management module 321 is used, and a company ID is used as key information for determining an authentication device. However, the key information for determining the authentication device is not limited to the company ID.

The authentication service determination service 300 includes the third management module 321, the key extraction module 302, the acquisition module 303, and the access guiding module 304. Further, the authentication service determination service 300 includes a determination module 331, a request module 332, a second key extraction module 333, a second acquisition module 334, and a second access guiding module 335.

When the authentication service determination service 300 receives access from an unauthenticated user, the determination module 331 determines whether a company ID is contained in the parameters of the access of the user. If the company ID is not contained in the parameters, the request module 332 causes the client PC 200 to display a screen for requesting the company ID. The second key extraction module 333 extracts the company ID entered on the screen.

Using the extracted company ID, the second acquisition module 334 acquires information of the authentication device from the third management module 321. According to the extracted information of the authentication device, the second access guiding module 335 guides the access of the user to the authentication service determination service 300 to an appropriate authentication service.

Figure 15:
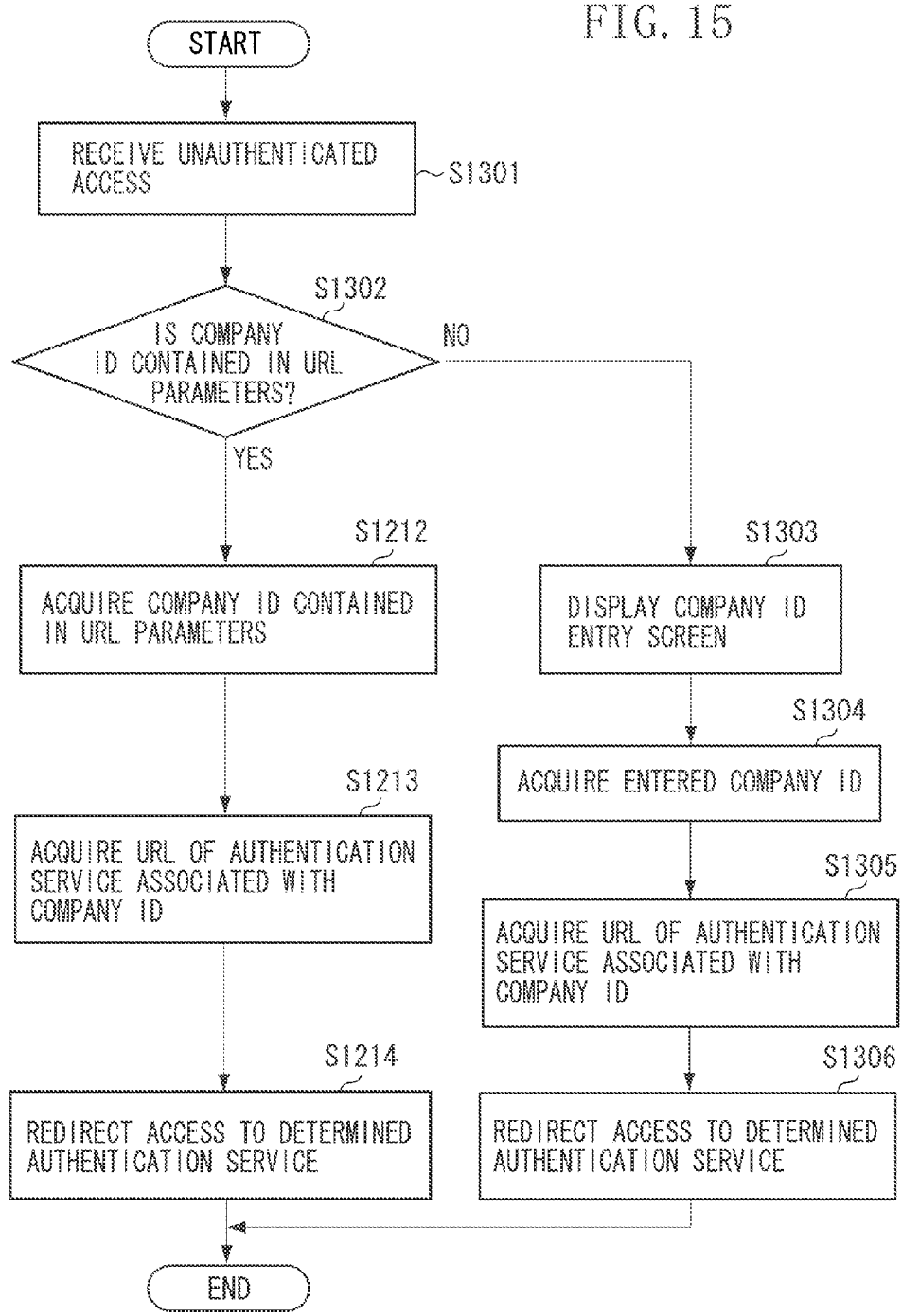
FIG. 15 illustrates a flow of processing in the authentication service determination service according to the third exemplary embodiment of the present invention.

FIG. 15 illustrates a flow of processing performed by the authentication service determination service 300 according to the third exemplary embodiment. The same reference numerals are assigned to steps in the flowchart which are similar to those in FIG. 13, and only different points will be described. The processing in the flowchart starts when the user directly accesses the authentication service determination service or the user access is redirected by the service providing service 500. The source of the redirect of the access is not limited to the service providing service 500.

In step S1301, the authentication service determination service 300 receives access of an unauthenticated user. In step S1302, the determination module 331 determines whether a company ID is contained in the URL parameters of the access of the unauthenticated user. If the determination module 331 determines that the company ID is contained (YES in step S1302), the processing proceeds to step S1212. If the determination module 331 determines that the company ID is not contained (NO in step S1302), the processing proceeds to step S1303. The company ID may be acquired from information other than the URL parameters.

Figure 16:
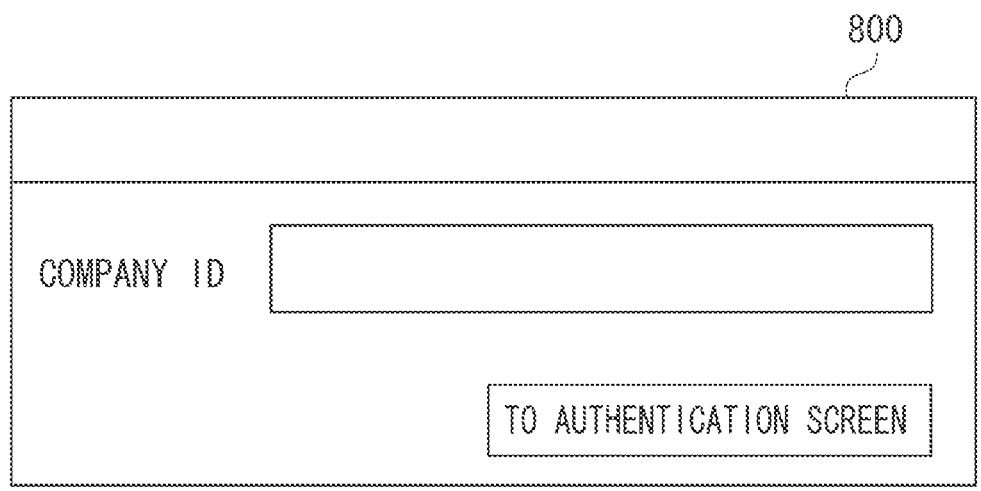
FIG. 16 illustrates an example of a screen for entering a company ID according to the third exemplary embodiment of the present invention.

In step S1303, the request module 332 causes the client PC 200 to display a company ID entry screen 800 as illustrated in FIG. 16.

In step S1304, the second key extraction module 333 extracts the company ID entered on the company ID entry screen 800.

In step S1305, the second acquisition module 334 acquires information of the authentication device associated with the company ID from the third management module 321 using the company ID acquired in step S1304. For example, if the company ID extracted in step S1304 is "11111111", the device information that can be acquired is the URL "http://service_b/?sp=http%3A%2F%2Fservice_a%2F" of the authentication service B 450. It is assumed that the URL in this example is used when the authentication service B 450 and the authentication service A 400 operate in the SSO system.

In step S1306, the second access guiding module 335 redirects the access of the unauthenticated user using the device information acquired in step S1305. In this processing, if in step S1301 access destination information for use after the completion of the authentication is received, the information is added in step S1306, and the access is redirected. If the redirect is completed, the processing in the flowchart ends.

FIG. 16 illustrates an example of a screen for entering a company ID according to the third exemplary embodiment. On the screen, the user can enter a company ID of a company that the user belongs to.

According to the third exemplary embodiment, even if the key information for determining the authentication device is not contained in the access of the unauthenticated user, it is possible to prompt the user to enter the key information for determining the authentication device. Accordingly, the access of the unauthenticated user can be guided to the appropriate IdP, and the user can be authenticated.

A fourth exemplary embodiment of the present invention is described below with reference to the attached drawings. Descriptions of points similar to those in the third exemplary embodiment are omitted, and only different points will be described below.

Figure 17:
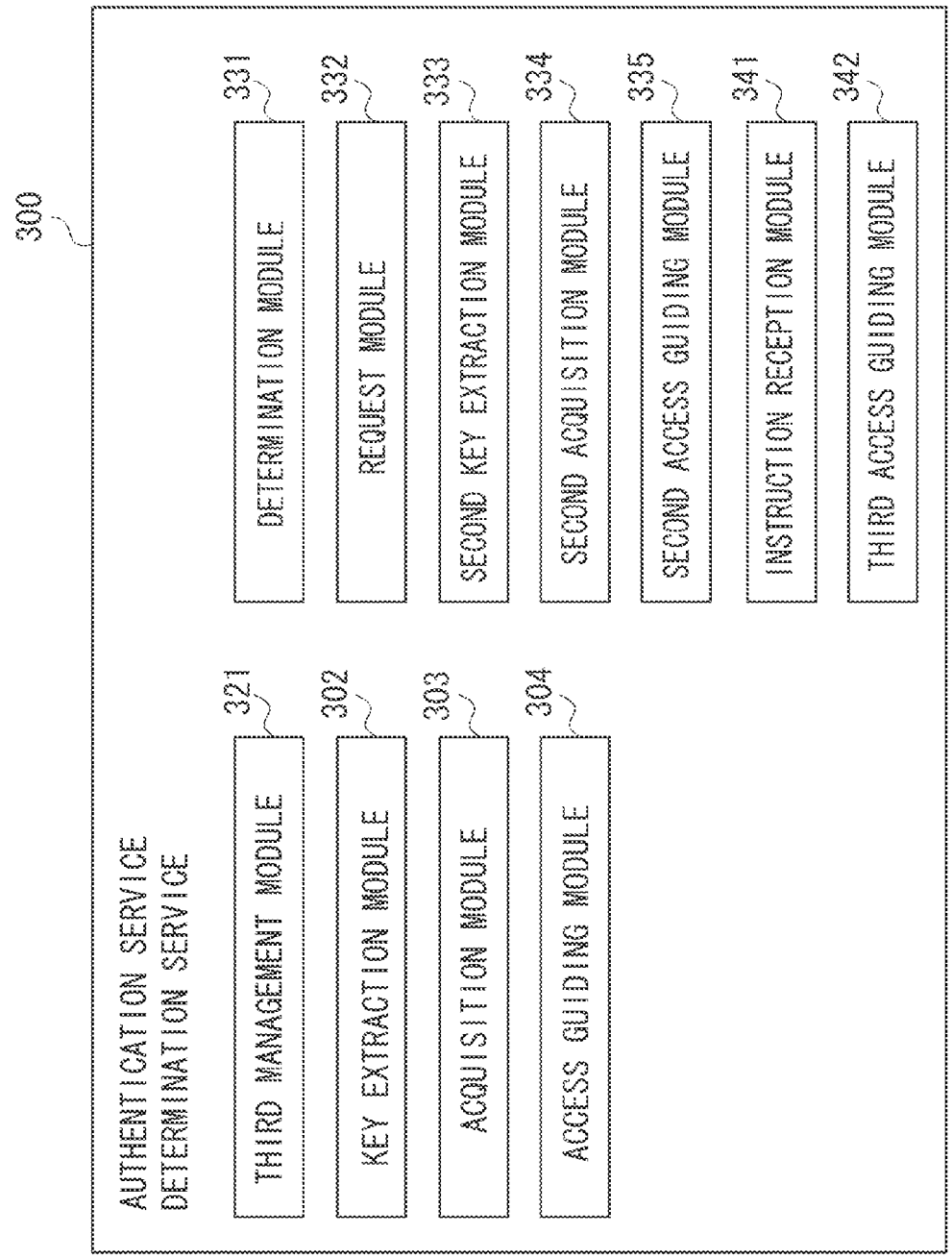
FIG. 17 illustrates a module configuration of an authentication service determination service according to a fourth exemplary embodiment of the present invention.

FIG. 17 illustrates a module configuration of the authentication service determination service 300 according to the fourth exemplary embodiment. In the present exemplary embodiment, the third management module 321 is used, and a company ID is used as key information for determining an authentication device. However, the key information for determining the authentication device is not limited to the company ID.

The authentication service determination service 300 includes the third management module 321, the key extraction module 302, the acquisition module 303, and the access guiding module 304. Further, the authentication service determination service 300 includes the determination module 331, the request module 332, the second key extraction module 333, the second acquisition module 334, and the second access guiding module 335. Furthermore, the authentication service determination service 300 includes an instruction reception module 341 and a third access guiding module 342.

When the authentication service determination service 300 receives access from an unauthenticated user, the instruction reception module 341 checks whether specification of an authentication service is validated in the parameters of the access of the user. As a result of the check, if the specification is validated, the third access guiding module 342 guides the access of the user to the specified service.

Figure 18:
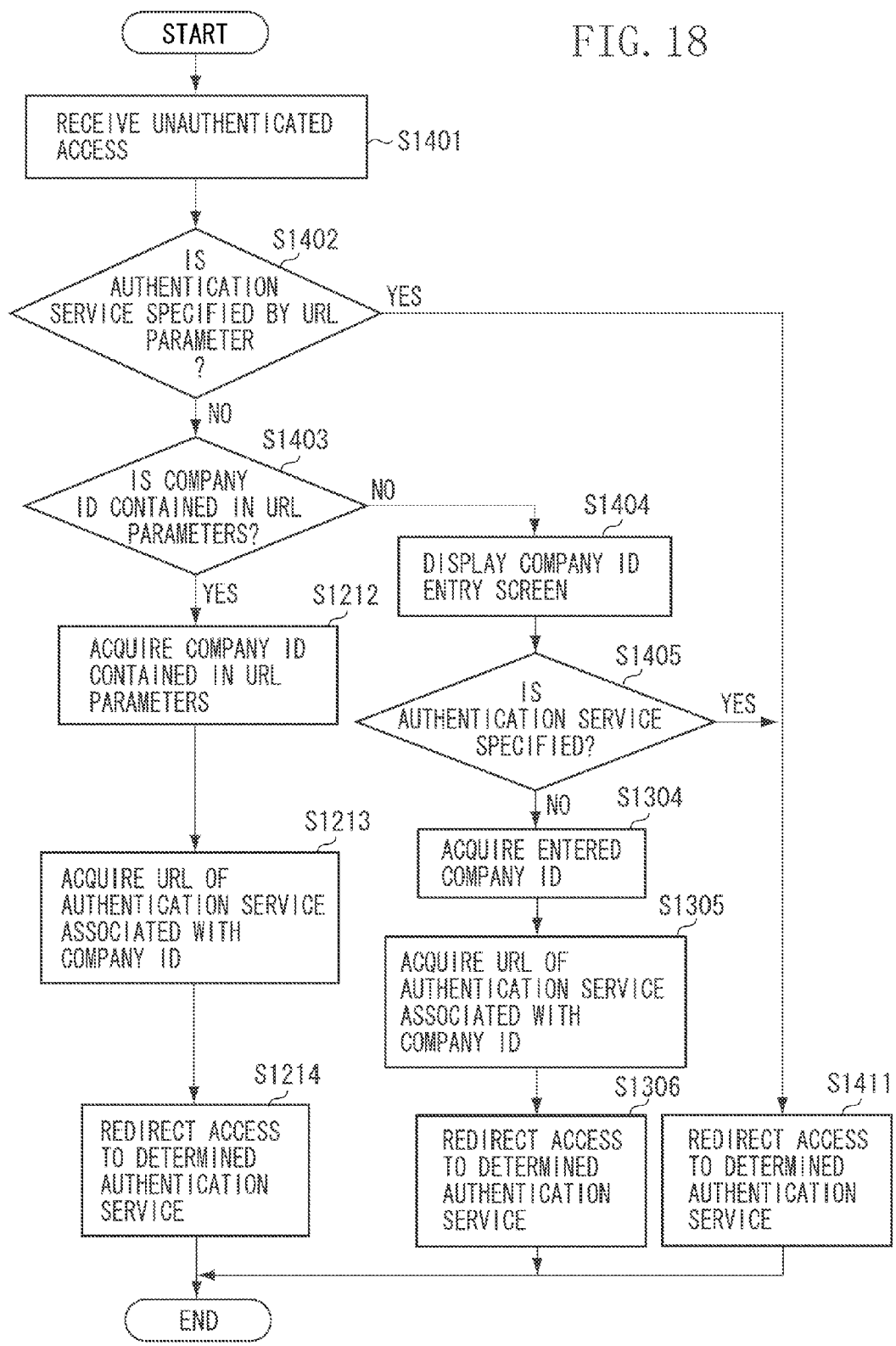
FIG. 18 illustrates a flow of processing in the authentication service determination service according to the fourth exemplary embodiment of the present invention.

FIG. 18 illustrates a flow of processing performed by the authentication service determination service 300 according to the fourth exemplary embodiment. The same reference numerals are assigned to steps in the flowchart which are similar to those in FIG. 15, and only different points will be described.

The processing in the flowchart starts when the user directly accesses the authentication service determination service or the user access is redirected by the service providing service 500. The source of the redirect of the access is not limited to the service providing service 500.

The processing in the flowchart is assumed to be performed especially in the following case. In the company that the user belongs to, the authentication service B 450 is supposed to authenticate the access, and the authentication service A 400 is supposed to authenticate the access in the SSO. However, for any reason, the user does not have an account for the authentication service B 450 and thus cannot be authenticated in the authentication service A 400 by the SSO. In such a case, the user is required to be directly authenticated in the authentication service A. For example, the case includes an administrator in the company. The administrator is not required to receive the service of the authentication service B 450. Thus, the administrator may not register his/her authentication information in the authentication service B450.

In step S1401, the authentication service determination service 300 receives access of an unauthenticated user. In step S1402, the instruction reception module 341 determines whether specification of an authentication service is contained in URL parameters of the access of the unauthenticated user. If the instruction reception module 341 determines that the specification is not contained (NO in step S1402), the processing proceeds to step S1403. If the instruction reception module 341 determines that the specification is contained (YES in step S1402), the processing proceeds to step S1411.

In step S1403, the determination module 331 determines whether a company ID to be key information is contained in the URL parameters of the access of the unauthenticated user. If the determination module 331 determines that the company ID is contained (YES in step S1403), the processing proceeds to step S1212. If the determination module 331 determines that the company ID is not contained (NO in step S1403), the processing proceeds to step S1404. The company ID may be acquired from information other than the URL parameters.

Figure 19:
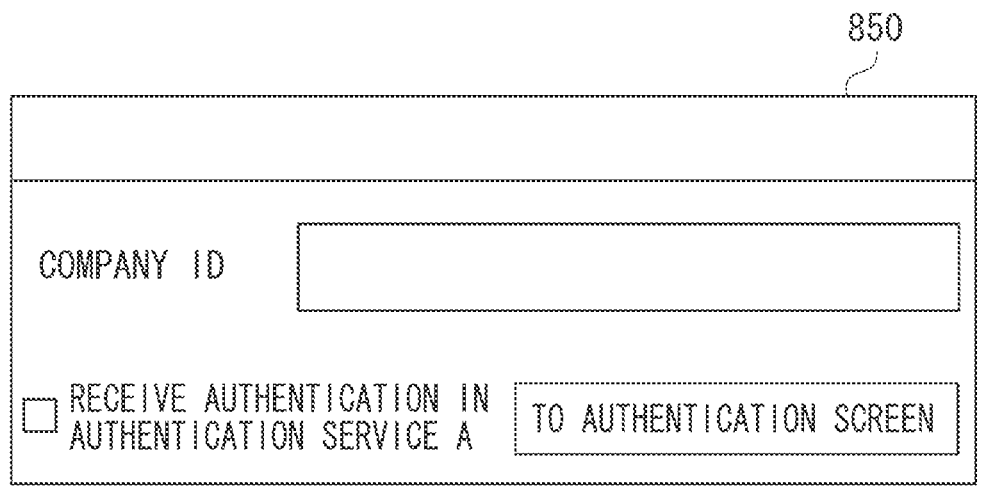
FIG. 19 illustrates an example of a screen for entering a company ID according to the fourth exemplary embodiment of the present invention.

In step S1404, the request module 332 causes the client PC 200 to display a company ID entry screen 850 as illustrated in FIG. 19.

In step S1405, the instruction reception module 341 determines whether a specific authentication service is specified on the company ID entry screen 850. For example, the instruction reception module 341 determines whether the check box of "RECEIVE AUTHENTICATION IN AUTHENTICATION SERVICE A" is checked. If the instruction reception module 341 determines that the specific service is not specified (NO in step S1405), the processing proceeds to step S1304. If the instruction reception module 341 determines that the specific service is specified (YES in step S1405), the processing proceeds to step S1411.

In step S1411, according to the specification in step S1402 or S1404, the third access guiding module 342 redirects the access of the unauthenticated user. In this processing, if in step S1401 access destination information for use after the completion of the authentication is received, the information is added in step S1411, and the access is redirected. If the redirect is completed, the processing in the flowchart ends.

FIG. 19 illustrates an example of the screen for entering a company ID according to the fourth exemplary embodiment. On the screen, the user can enter the company ID of the company that the user belongs to. The user who wants to be authenticated in the authentication service A 400 for any reason can check the box of "RECEIVE AUTHENTICATION IN AUTHENTICATION SERVICE A". Then, regardless of the setting of the authentication service associated with the entered company ID, the user can be authenticated in the authentication service A.

According to the fourth exemplary embodiment, when the user wants to be authenticated in the specific authentication service, regardless of the key information for determining the authentication device, the access of the user can be guided to the specified IdP, and the user can be authenticated.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. Each feature disclosed in the description, and (where appropriate) the claims and drawings may be provided independently or in any appropriate combination.

This application claims priority from Japanese Patent Application No. 2011-029995 filed Feb. 15, 2011, which is hereby incorporated by reference herein in its entirety.

What is claimed is:

1. An information processing system which provides Web services and is capable of communicating with a client and at least one authentication device for providing an authentication processing service for requesting entry of authentication information and performing authentication processing, the information processing system comprising:
a providing unit configured to provide the Web services by relying on success of the authentication processing performed by the authentication processing service without requesting entry of authentication information necessary for the authentication processing in an information processing apparatus;
a storage unit configured to store key information for determining an authentication device necessary in receiving any authentication service and address information of the authentication device by associating these information pieces with each other;
a transmission unit configured to transmit a screen for requesting entry of the key information to the client;
a determination unit configured to determine whether the key information is contained in a uniform resource locator (URL) which is used when the client accesses the information processing system;
an extraction unit configured to extract the key information from the URL; and
an instruction unit configured to, in a case where access from the client is unauthenticated access that has not received the authentication processing service, specify the key information which coincides with the key information acquired as a result of the access and is stored by the storage unit, transmit to the client the address information of the authentication device stored by being associated with the specified key information, and issue a redirect instruction to the client such that the client accesses the authentication device in order to receive the authentication processing service,
wherein
in a case where the key information is extracted by the extraction unit, the determination unit determines that the URL contains the key information,
in a case where the determination unit determines that the key information is contained in the URL, the instruction unit uses the key information acquired from the URL as the acquired key information,
in a case where the determination unit determines that the key information is not contained in the URL, the instruction unit uses the key information entered via the screen transmitted by the transmission unit as the acquired key information,
in a case where the URL used by the client in accessing the information processing system contains information which is different from the key information and is for receiving authentication in the specified authentication device, or in a case where an item which is contained in the screen transmitted by the transmission unit and for receiving the authentication in the specified authentication device is determined to be valid in the client, the instruction unit issues a redirect instruction such that the client accesses the specified authentication device regardless of the acquired key information, and
the information processing system comprises one or more processors and memory executing the providing unit, the determination unit, the extraction unit, and the instruction unit.

2. The information processing system according to claim 1, further comprising:
a second providing unit configured to provide the Web services,
wherein the second providing unit acquires an assertion from the client that accesses the authentication device in response to the instruction issued by the instruction unit, verifies the assertion, and provides the client with the Web services if the assertion is valid.

3. The information processing system according to claim 1, wherein the key information is a tenant identification (ID).

4. A method for controlling an information processing apparatus capable of communicating with a client and at least one authentication device for providing an authentication processing service, the method comprising:
causing a providing unit to provide Web services by performing single sign-on coordination with the authentication device and in response to acquisition of an authentication result in the authentication device;
causing a storing unit to store key information for determining the authentication device and address information of the authentication device by associating these information pieces with each other;
causing a transmission unit to transmit a screen to the client, for requesting entry of the key information;

causing a determination unit to determine whether the key information is contained in a uniform resource locator (URL) which is used when the client accesses the information processing apparatus;

causing an extraction unit to extract the key information from the URL; and causing an instruction unit to, in a case where access from the client is unauthenticated access which is not authenticated in the authentication device, issue a redirect instruction to access the authentication device by transmitting to the client the address information of the authentication device stored by being associated with the key information, in response to that the key information acquired as a result of the access coincides with the key information stored by the storage unit, wherein in a case where the key information is extracted by the extraction unit, the determination unit determines that the URL contains the key information, in a case where the determination unit determines that the key information is contained in the URL, the instruction unit uses the key information acquired from the URL as the acquired key information, in a case where the determination unit determines that the key information is not contained in the URL, the instruction unit uses the key information entered via the screen transmitted by the transmission unit as the acquired key information, and in a case where the URL used by the client in accessing the information processing apparatus contains information which is different from the key information and is for receiving authentication in the specified authentication device, or in a case where an item which is contained in the screen transmitted by the transmission unit and for receiving the authentication in the specified authentication device is determined to be valid in the client, the instruction unit issues a redirect instruction such that the client accesses the specified authentication device regardless of the acquired key information.

5. A non-transitory computer readable storage medium storing a program for causing a computer to execute a method according to claim 4.

6. An information processing system which provides Web services and communicates with a client and at least one authentication device to provide an authentication processing service by requesting input of authentication information and performing authentication processing, the information processing system comprising:

a providing unit configured to provide the Web services by relying on success of the authentication processing without requesting input of authentication information;

a storage unit configured to store key information for determining an authentication device for receiving an authentication service and address information of the authentication device corresponding to the key information; and an instruction unit configured to, in a case where access from the client is unauthenticated by the authentication processing service, specify the stored key information which coincides with the acquired key information resulting from the access, transmit to the client the stored address information of the authentication device corresponding to the specified stored key information, and issue a redirect instruction to the client such that the client accesses the authentication device corresponding to the address in order to receive the authentication processing service, wherein in a case where an access request used by the client in accessing the information processing system contains information which is different from the key information and is for receiving authentication in the specified authentication device, or in a case where it is determined that information inputted at the client is valid, the instruction unit issues a redirect instruction such that the client accesses a specified authentication device regardless of the acquired key information, and wherein one or more processors and memory execute the providing unit, and the instruction unit.

7. The information processing system according to claim 3, further comprising:

a transmission unit configured to transmit a screen for requesting entry of the key information to the client; and a determination unit configured to determine whether the key information is contained in a uniform resource locator (URL) which is used when the client accesses the information processing system, wherein the instruction unit uses the key information acquired from the URL as the acquired key information in a case where the determination unit determines that the key information is contained in the URL, and the instruction unit uses the key information entered via the screen transmitted by the transmission unit as the acquired key information in a case where the determination unit determines that the key information is not contained in the URL.

8. The information processing system according to claim 7, further comprising:

an extraction unit configured to extract the key information from the URL, wherein the determination unit determines that the URL contains the key information in a case where the key information is extracted by the extraction unit.

9. The information processing system according to claim 3, further comprising:

a second providing unit configured to provide the Web services, wherein the second providing unit acquires an assertion from the client that accesses the authentication device in response to the instruction issued by the instruction unit, verifies the assertion, and provides the client with the Web services if the assertion is valid.

10. The information processing system according to claim 3, wherein the key information is a tenant identification (ID).

11. A method for controlling an information processing apparatus communicating with a client and at least one authentication device for providing an authentication processing service, the method comprising:

providing Web services by performing single sign-on coordination with the authentication device and in response to acquisition of an authentication result in the authentication device;

storing key information for determining the authentication device and address information of the authentication device corresponding to the key information;

in a case where access from the client is unauthenticated by the authentication processing service, issuing a redirect instruction to access the authentication device by transmitting to the client the stored address information of the authentication device corresponding to the key information, in response to the key information acquired as a result of the access coinciding with the stored key information; and in a case where an access request used by the client in accessing the information processing apparatus contains information different from the key information and is for receiving authentication in the specified authentication device, or in a case where information inputted at the client is determined to be valid, issuing a redirect instruction so that the client accesses the specified authentication device regardless of the acquired key information.

12. A non-transitory computer readable storage medium storing a program for causing a computer to execute the method according to claim 11.

13. A system including a client and an information processing system which provides Web services and communicates with the client and at least one authentication device to provide an authentication processing service by requesting input of authentication information and performing authentication processing, the system comprising:

a request unit configured to request the information processing system for the Web services;

a providing unit configured to provide the Web services by relying on success of the authentication processing without requesting input of authentication information;

a storage unit configured to store key information for determining an authentication device for receiving an authentication service and address information of the authentication device corresponding to the key information; and an instruction unit configured to, in a case where access from the client is unauthenticated by the authentication processing service, specify the stored key information which coincides with the acquired key information resulting from the access, transmit to the client the stored address information of the authentication device corresponding to the specified stored key information, and issue a redirect instruction to the client such that the client accesses the authentication device corresponding to the address in order to receive the authentication processing service, wherein in a case where an access request used by the client in accessing the information processing system contains information which is different from the key information and is for receiving authentication in the specified authentication device, or in a case where it is determined that information inputted at the client is valid, the instruction unit issues a redirect instruction such that the client accesses a specified authentication device regardless of the acquired key information, and wherein one or more processors and memory execute the providing unit, and the instruction unit.

\* \* \* \* \*